United States Patent
Bongard et al.

(10) Patent No.: US 8,052,557 B2
(45) Date of Patent: Nov. 8, 2011

(54) HYDRAULIC AUTO-TENSIONER WITH DOUBLE SEAL RING

(75) Inventors: Andreas Bongard, Pähl (DE); Oliver Daub, Remseck (DE)

(73) Assignee: iwis motorsystems GmbH & Co. KG, Munich (DE)

( * ) Notice: Subject to any disclaimer, the term of this patent is extended or adjusted under 35 U.S.C. 154(b) by 368 days.

(21) Appl. No.: 12/409,147

(22) Filed: Mar. 23, 2009

(65) Prior Publication Data

US 2009/0247336 A1   Oct. 1, 2009

(30) Foreign Application Priority Data

Apr. 1, 2008   (DE) .......................... 10 2008 016 654

(51) Int. Cl.
*F16H 7/22*   (2006.01)
(52) U.S. Cl. ....................................... 474/110; 474/111
(58) Field of Classification Search ........... 474/109–111
See application file for complete search history.

(56) References Cited

U.S. PATENT DOCUMENTS

| | | | | |
|---|---|---|---|---|
| 4,925,436 A | * | 5/1990 | Hayashi et al. | 474/101 |
| 4,950,209 A | * | 8/1990 | Kawashima et al. | 474/138 |
| 5,073,149 A | * | 12/1991 | Maruyama et al. | 474/104 |
| 5,104,359 A | * | 4/1992 | Shirai et al. | 474/110 |
| 2003/0171178 A1 | * | 9/2003 | Maino | 474/109 |
| 2006/0063625 A1 | * | 3/2006 | Emizu et al. | 474/110 |

FOREIGN PATENT DOCUMENTS

DE                37 37 629 A1     6/1988

* cited by examiner

*Primary Examiner* — Sang Kim
(74) *Attorney, Agent, or Firm* — Leydig, Voit & Mayer, Ltd.

(57) ABSTRACT

The present invention relates to a hydraulic auto-tensioner, in particular for a chain drive of an internal combustion engine, comprising a housing, a tensioning plunger guided in a plunger bore of said housing, a free piston guided in said plunger bore, and a plunger rod formed on said tensioning plunger and extending through the free piston. The tensioning plunger, the housing and the free piston delimit a hydraulic reservoir which is sealed with respect to the housing and the plunger rod by means of a sealing unit that is arranged on the free piston. The sealing unit is implemented as a double seal ring with an outer sealing surface which is in sliding contact with the plunger bore of the housing, and an inner sealing surface which is in sliding contact with the plunger rod of the tensioning plunger. In addition, the present invention relates to the use of such a double seal ring in a hydraulic auto-tensioner.

15 Claims, 2 Drawing Sheets

HYDRAULIC AUTO-TENSIONER WITH DOUBLE SEAL RING

The present invention relates to a hydraulic autarkic auto-tensioner, in particular for a chain drive of an internal combustion engine, comprising a housing, a tensioning plunger guided in a plunger bore of said housing, a free piston guided in said plunger bore, a plunger rod formed on said tensioning plunger and extending through the free piston, a hydraulic reservoir delimited by the tensioning plunger, the housing and the free piston, and a sealing unit which is arranged on the free piston and by means of which the hydraulic reservoir is sealed with respect to the housing and the plunger rod.

Simple tensioning devices, which are used in particular as chain tensioners in timing chain drives of internal combustion engines, normally comprise a housing having arranged therein a tensioning plunger which is pretensioned by means of a pressure spring. Between the tensioning plunger and the housing a pressure chamber is formed, which is filled with a hydraulic medium for damping the retracting movement of the tensioning plunger and which has normally also arranged therein the pressure spring. The pressure chamber normally communicates via a check valve with an external hydraulic circuit by means of which the hydraulic medium in the pressure chamber is highly pressurized. The hydraulic medium can escape from the pressure chamber through a throttle opening in the end face of the tensioning plunger or through suitable leak gaps between the tensioning plunger and the housing, in particular in the case of a pressure increase in the pressure chamber induced by a retracting movement of the tensioning plunger.

The pressurized hydraulic medium in the pressure chamber prevents an excessive retracting movement of the tensioning plunger into the housing even if the tensioning plunger is subjected to comparatively hard and forceful vibration impacts. However, when the internal combustion engine and the external hydraulic circuit, respectively, have been switched off, the pressure of the hydraulic medium in the pressure chamber will decrease and, depending on the mounting position of the tensioner, the pressure chamber may be evacuated partly or fully. When the engine and the chain drive, respectively, are restarted, this may result in an unhindered retracting movement of the plunger, whereby undesirable chattering in the internal combustion engine or tooth jumping of the timing chain may be caused. This effect is aggravated when a shift of the operating range of the plunger in the direction of tensioning is caused by wear or by other phenomena.

In the field of technology, different concepts have been developed for preventing the undesirable retracting movement of the tensioning plunger into the housing. In addition to fully mechanical arresting means, which block the retracting movement of the plunger with the aid of spring-loaded locking elements, there are also hydraulically operated readjustment means, which allow a continuous shift of the operating range of the tensioning plunger; each of said concepts continues to utilize an external supply of the pressure chamber with the hydraulic medium.

In addition, there are also automatic tensioners or autarkic auto-tensioners in the case of which a strong decrease of the hydraulic pressure or an evacuation of the pressure chamber is prevented by a closed hydraulic system so as to automatically prevent undesirable deep dropping of the tensioning plunger into the housing. Such a hydraulic auto-tensioner with automatic readjustment of the tensioning plunger is already known from DE 37 37 629 A1. This hermetically sealed, self-tensioning tensioner comprises a hollow-cylindrical housing with a tensioning plunger, which is guided in said housing and which has integrally formed thereon a plunger rod, and a free piston, which subdivide the interior of the housing into a pressure chamber, a hydraulic reservoir and an air space. In view of the fact that the volume of the pressure chamber changes during a retracting or extension movement of the tensioning plunger, the reservoir must take up the hydraulic medium from the pressure chamber or discharge said hydraulic medium so as to compensate said volume changes, the free piston moving not only relative to the plunger rod of the tensioning plunger but also relative to the housing. In order to seal the hydraulic reservoir, and consequently also the chain tensioner area filled with hydraulic medium, with respect to the air space, the free piston has provided thereon a sliding seal which seals said free piston relative to the housing as well as relative to the plunger rod.

Due to the structural design of hydraulic autarkic auto-tensioners, the plunger rod tends to tilt, since an exact support of the plunger rod does not exist in the upper plunger rod portion and since in the area of the free piston the plunger rod is only supported to a very limited extent in view of the slide seals. Even an extremely small tilting movement of the tensioning plunger may, however, lead to a formation of scratches and striae on the sliding surfaces of the plunger as well as on the plunger bore of the housing, whereby the efficiency and the performance characteristics of this auto-tensioner will be negatively influenced. In addition to these problems, it is also necessary that, in the free piston production process, attention is paid to the necessary good sealing of the associated slide seals, and this leads to a high expenditure for the structural design and the production of the free piston.

Taking all this into account, it is the object of the present invention to provide a hydraulic auto-tensioner which avoids or reduces the disadvantages of tensioner known from the prior art and which allows the hydraulic tensioner to be designed as easily as possible and at the lowest possible price.

According to the present invention, this object is achieved in that the sealing unit of the hydraulic auto-tensioner is implemented as a double seal ring with an outer sealing surface which is in sliding contact with the plunger bore of the housing, and an inner sealing surface which is in sliding contact with the plunger rod of the tensioning plunger. Due to the use of an integrally formed double seal ring with an outer and an inner sealing surface, additional sealing measures at the free piston can be dispensed with. The double seal ring is, together with the free piston acting as a seal carrier, axially movable relative to the housing and the plunger rod along the longitudinal axis of the tensioning plunger. Due to the use of such a slide seal ring which is radially effective on both sides, the structural design of the free piston can be essentially simplified. Hence, both the structural design and the production can be focussed on the important guidance aspect of the free piston.

In order to allow a sufficient and reliable radial sealing effect with respect to the housing and the plunger rod even during axial movements of the double seal ring, the outer sealing surface and the inner sealing surface can be implemented as annular, circumferentially extending sealing surfaces, said sealing surfaces being spaced apart and oriented coaxially with the longitudinal axis of the tensioning plunger. In addition, it will be of advantage when the outer sealing surface and the inner sealing surface are arranged on two axially protruding, annularly extending projections of the double seal ring, which allow said outer and inner sealing surfaces to flexibly contact the surfaces of the plunger bore and of the plunger rod. An advantageous embodiment is so conceived that the outer sealing surface and/or the inner sealing surface comprise(s) at least two circumferentially extending sealing lips. Due to the use of two or more sealing lips, the radial sealing effect of the double seal ring can be improved, whereas the sealing surfaces' tendency to adhere is simultaneously reduced.

A preferred modification is so conceived that the double seal ring comprises an outer guide portion and an inner guide portion. The outer guide portion of the double seal ring allows, in addition to the sealing function of the outer sealing surface, also an effective guidance of the double seal ring and of the free piston connected thereto along the plunger bore of the housing. This reduces the problems that may be caused by a tilting tensioning plunger in hydraulic auto-tensioners and by the resultant scratches and striae in the plunger bore of the housing that have a negative influence on the performance characteristics. Furthermore, such improved guidance will reduce the sealing surfaces' tendency to leak. The inner guide portion of the double seal ring improves, in the same way, the guiding characteristics of the double seal ring and of the free piston connected thereto with respect to the plunger rod. In either case, it will be expedient to arrange the outer and inner guide portions between the outer or inner sealing surfaces and the free piston acting as a supporting and guiding element, so as to avoid any influence on the sealing effect of the double seal ring. For an optimum guiding function of the outer and/or inner guide portions, the axial length of the outer guide portion and/or of the inner guide portion can be at least 2 mm, preferably between 4 and 5 mm.

In order to improve the sliding characteristics of the outer and inner sealing surfaces when said surfaces are in sliding contact with the plunger bore and the plunger rod, the double seal ring can be made of PTFE, at least in the areas of the outer sealing surface and of the inner sealing surface. Due to the low coefficient of friction which is combined with a high heat resistance, the use of PTFE (polytetrafluoroethylene) or of a PTFE compound will prevent the occurrence of a stick-slip effect between the seal and the plunger bore or the plunger rod. It is thus possible to avoid negative effects on the supporting and guiding characteristics of the double seal ring by a suitable selection of material. In addition to the use of PTFE or of a PTFE compound, it is also possible to provide a double seal ring consisting, at least partially, of a modified PTFE or a modified PTFE compound which is configured for the dual guiding and sealing function, so as to simultaneously improve also the supporting and guiding characteristics of the double seal ring. For optimally utilizing the sliding characteristics of a double seal ring consisting preferably at least partially of PTFE, a bearing material will have to be used for the sliding mates, i.e. the plunger bore of the housing and the plunger rod, which cooperates effectively with the material of the sealing surfaces, said bearing material being e.g. a highly wear-resistant plastic material, metal, non-ferrous metals or ceramic. A material that turned out to be an advantageous bearing material is brass.

According to an advantageous embodiment, the double seal ring can be provided with a spring means, said spring means pretensioning the outer sealing surface relative to the plunger bore and the inner sealing surface relative to the plunger rod. The spring means stabilizes the double seal ring, especially when the outer and inner sealing surfaces are arranged on circumferentially extending projections, and permits the necessary high sealing force to be built up in the radial direction, so as to allow in the hydraulic reservoir a pressure above atmospheric pressure. The spring means can be implemented as a spring washer which is U-shaped in cross-section and which comprises an outer spring leg and an inner spring leg, said outer spring leg acting on the outer sealing surface and said inner spring leg acting on the inner sealing surface. In spite of the simple construction of such a U-shaped spring washer, the spring legs can effectively apply a pressure, i.e. a pretension onto the outer and inner sealing surfaces.

In order to allow easy and reliable mounting of the double seal ring on the free piston, the double seal ring can comprise a circumferentially extending projection and the free piston can comprise a circumferentially extending fixing groove, the projection of the double seal ring being adapted to be inserted into the fixing groove of the free piston so as to arrange the double seal ring on said free piston. The circumferentially extending projection defines, according to an expedient embodiment, a snap-in protrusion which is especially configured for insertion into the fixing groove and through which a positive connection is established between the double seal ring and the free piston acting as a seal carrier.

Another embodiment of the hydraulic auto-tensioner is so conceived that the housing is provided with a mounting opening on an end face facing away from the plunger rod, said mounting opening being adapted to be closed by an end plug. Such a mounting opening allows, in addition to a simple production of the housing, an assembly of the hydraulic tensioner from the mounting side, which is located opposite to the side where the tensioning plunger exits the housing. In addition to easier mounting of the tensioner from the back, it is here also possible to dispense with a guide bushing on the tensioning side of the hydraulic tensioner, so that the tensioning plunger outlet on the tensioning side can be implemented as part of the housing, whereby more precise guidance can be achieved through a higher accuracy of the bore for the plunger rod. The features according to claim 10 could also be protected independently of any of the claims 1 to 9 and be prosecuted separately. Independently of the seal means arranged on the free piston, the mounting opening, which is adapted to be closed by the end plug and which is provided in the mounting-side end face of the housing (the end face facing away from the tensioning side), allows a simpler and less expensive structural design and, through a more effective guidance of the plunger rod on the tensioning side of the housing, a reduction of the risk that the plunger may get wedged; this leads to a reduced load on the sealing means and, consequently, also to an improvement of the sealing effect.

In order to allow a reliable sealing of the highly pressurized hydraulic medium in the pressure chamber, a seal, preferably a resilient seal ring, such as an O-ring, can be provided between the housing and the end plug.

In addition, the present invention relates to the use of a double seal ring in a hydraulic auto-tensioner, in particular for the chain drive of an internal combustion engine, said double seal ring comprising an outer sealing surface and an inner sealing surface, said outer sealing surface being adapted to be brought into sliding contact with a plunger bore of the tensioner housing, and said inner sealing surface being adapted to be brought into sliding contact with a plunger rod of the tensioning plunger. The use of such a double seal ring with sealing surfaces producing, on both sides, a sealing effect in the radial direction allows efficient sealing, although the inner and outer sealing surfaces are axially movable relative to the complementary components. The integral structural design of the double seal ring comprising outer and inner sealing surfaces with a common seal carrier already reduces the stick slip effect. An optimization of the guiding function can here be achieved by providing outer and inner guide portions on the double seal ring as well as by establishing a positive connection between the double seal ring and the seal carrier. The sealing function can be improved still further by structural measures, e.g. arranging sealing surfaces on axially protruding bulges, creating a pretension with the aid of a spring means and using circumferentially extending sealing lips, or by suitable materials, e.g. the use of PTFE or a PTFE compound in the area of the sealing surfaces.

In the following, the structural design and the function of a hydraulic auto-tensioner according to the present invention will be explained in more detail, on the basis of one embodiment, with reference to the drawings enclosed, in which.

Figure 1:
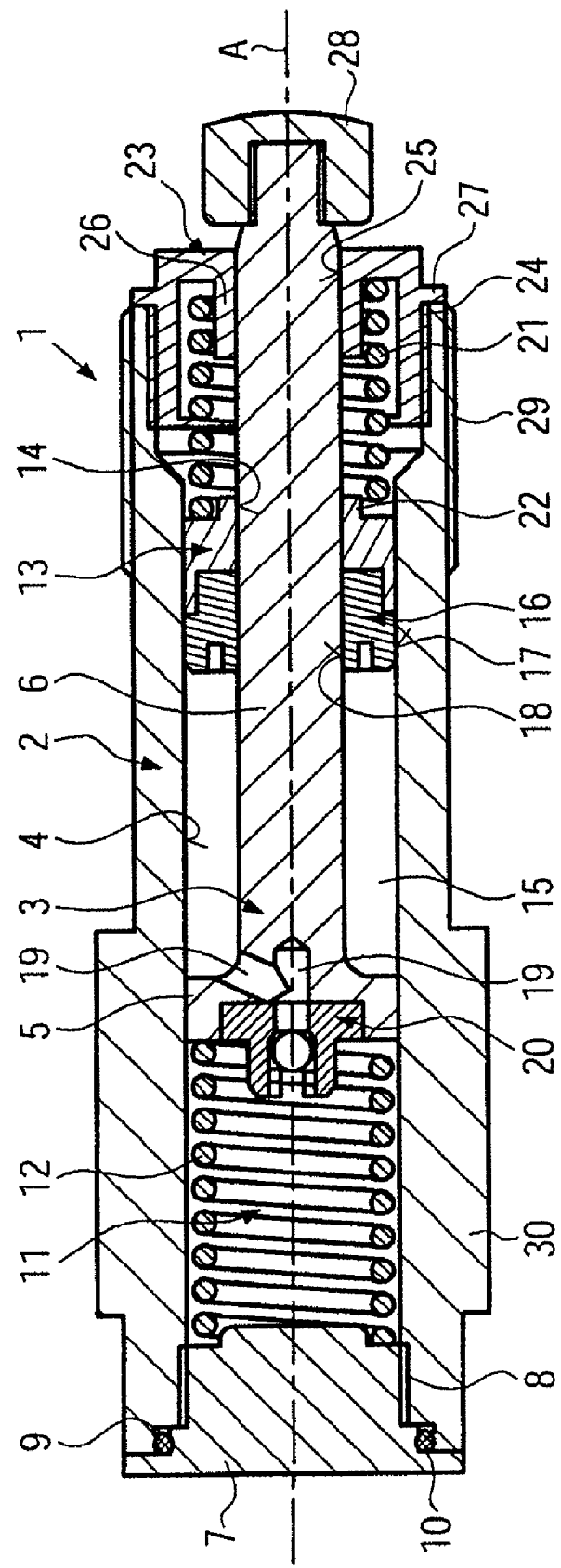
FIG. 1 shows a cross-sectional view through a hydraulic auto-tensioner according to the present invention, which comprises a double seal ring.

FIG. 1 shows a hydraulic self-contained auto-tensioner 1 used for the timing chain drive or a secondary unit drive of an internal combustion engine and comprising a hollow-cylindrical housing 2 in which a tensioning plunger 3 is guided such that it is longitudinally movable along the axis A in the plunger bore 4 of the housing. The tensioning plunger 3 comprises a plunger base 5 through which the tensioning plunger 3 is guided in the plunger bore 4 as well as a plunger rod 6 following said plunger base 5 in the direction of tensioning and extending beyond the end face of the housing 2 on the tensioning side of the hydraulic tensioner 1 so as to apply a pretension to an adjoining chain drive. On the mounting side of the hydraulic tensioner 1, which is the side facing away from the tensioning side, an end plug 7 is provided in the opening formed in the hollow-cylindrical housing 2 on the end face thereof, said end plug 7 being mounted in the open end of said hollow-cylindrical housing 2 by means of a screw connection 8. Between the end plug 7 and a step 9 formed on the inner wall of the housing 2 such that it is set back relative to the plunger bore 4 and the screw connection 8, an O-ring 10 is provided for the purpose of sealing. The end plug 7, which is screw-fastened with and sealed with respect to the housing 2, defines together with said housing 2 and the plunger base 5 of the tensioning plunger 3 a pressure chamber 11, which is filled with a highly pressurized hydraulic medium when the auto-tensioner is in operation. The tensioning plunger 3 is axially pretensioned by means of a helical pressure spring 12, which is arranged in the pressure chamber 11 and which presses the tensioning plunger 3 in the direction of the axis A against a driving chain (not shown) of the internal combustion engine. The pressure spring 12 is guided by a projection extending from the end plug 7 into the pressure chamber 11.

In an area of the hollow-cylindrical housing 2 constituting the front area when seen in the tensioning direction, an annular free piston 13 is provided, which is guided such that it is longitudinally movable along the axis A in the plunger bore 4 of the housing 2 as well as on the plunger rod 6 of the tensioning plunger 3. For accommodating the plunger rod 6, the free piston 13 is provided with a central bore 14 through which the plunger rod 6 extends. The free piston 13 defines, together with the plunger base 5 and the housing 4, an annular hydraulic reservoir 15 through which the lower part of the plunger rod 6 extends. On the side of the free piston 13 facing the hydraulic reservoir 15, a double seal ring 16 is provided, the outer sealing surface 17 of said double seal ring 16 sealing the hydraulic reservoir 15 with respect to the inner wall of the plunger bore 4 of the housing 2, whereas the inner sealing surface 18 thereof seals the hydraulic reservoir 15 with respect to the outer wall of the plunger rod 6.

The pressure chamber 11 filled with the hydraulic medium is supplied with hydraulic medium from the hydraulic reservoir 15 via hydraulic passages 19 provided in the plunger base 5 and via a check valve 20 located on the back of the plunger base 5. The check valve 20 is press-fitted in a seat provided on the plunger base back, which faces away from the tensioning direction. The valve ball of the check valve closes the pressure chamber 11 off from the hydraulic reservoir 15 by means of the pretension of the valve spring. Hydraulic medium that escapes from the pressure chamber 11 through the leak gap between the plunger base 5 and the plunger bore 4 of the housing 2 is stored in the hydraulic reservoir 15.

The free piston 13 is pretensioned in a direction opposite to the tensioning direction by means of a return spring 21. The return spring 21 is arranged on the side of the free piston 13 which faces away from the hydraulic reservoir 15 and it is guided by a guide projection 22 extending from the free piston 13 in the tensioning direction. The return spring 21 guided in the air space of the housing 2 rests on the housing end face located on the tensioning side. The tensioning-side end of the housing 2 has additionally provided therein a hole plug 23, which is fixedly mounted in the housing 2 by means of a screw connection 24, said screw connection 24 being set back relative to the plunger bore 4. The hole plug 23 is provided with a central opening 25 through which the plunger rod 6 extends beyond the housing 2 in the tensioning direction, said opening 25 being extended inwards by an annular flange 26 of the hole plug 23 for accommodating the plunger rod 6 so that the plunger rod 6 can be guided more effectively. The outer wall of said annular flange 26 is also used for guiding the return spring 21. The outer circumference of the hole plug 23 has additionally provided thereon a flange 27 which abuts on the tensioning-side end face of the housing 2. The tensioning-side end of the plunger rod 6 has attached thereto a tensioning head 28, which is screwed onto said plunger rod 6 and through which the tensioning plunger 3 applies pressure onto a suitable tensioning unit (not shown) so as to apply the pretension of the pressure spring 12 to the driving chain.

The outer circumference of the housing 2 of the hydraulic auto-tensioner 1 has a threaded section 29 on the tensioning side and a flangelike enlarged section 30 on the mounting side facing away therefrom. By means of the threaded section 29, the hydraulic auto-tensioner 1, which is implemented as a screw-in type tensioner, can be mounted in the engine block of an internal combustion engine, the enlarged section 30 limiting the screw-in operation of the hydraulic tensioner 1. The enlarged section 30 and the engine block can have provided between them a flat seal. Alternatively, the hydraulic auto-tensioner 1 may also be implemented as a flange-type tensioner and the housing 2 may be implemented as a flange-type housing.

Figure 2:
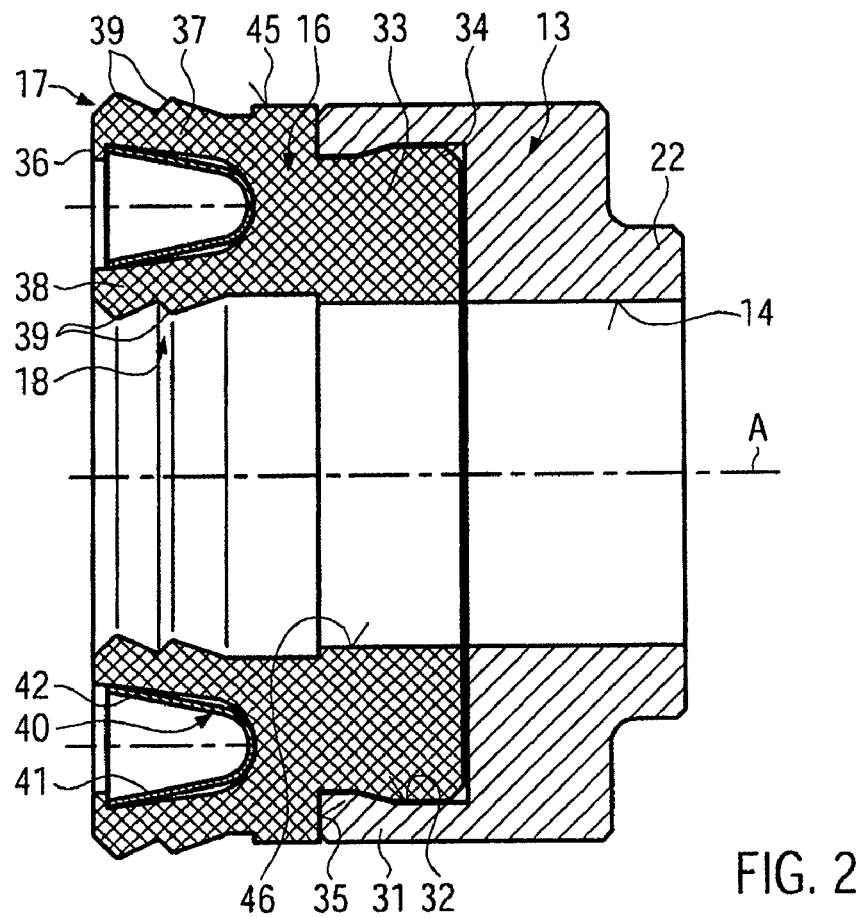
FIG. 2 shows an enlarged sectional view through the free piston having the double seal ring according to FIG. 1 arranged thereon.

FIG. 2 shows an enlarged sectional view of the free piston 13 and of the double seal ring 16 provided thereon. On the side facing the hydraulic reservoir 15, the free piston 13 is provided with a ring 31 projecting in the outer area and extending the outer circumference, said ring 31 having a fixing groove 32 provided on the inner side thereof and facing the axis A. The double seal ring 16 is provided with a seal ring carrier 33 from which two axially extending annular projections 37, 38 extend in the direction of the hydraulic reservoir 15. The end of the seal ring carrier 33 facing the tensioning direction has provided thereon a radial, circumferentially extending projection 34, which engages the fixing groove 32 of the free piston 13 like a snap-in protrusion so as to establish a positive connection between the parts in question. Furthermore, a shoulder 35 is provided in the central area of the double seal ring, said shoulder 35 abutting on the free end face of the projecting ring 31 of the free piston 13. Between the shoulder 35 and the outer annular projection 37, the seal ring carrier 33 is provided with an outer guide portion 45 by means of which the double seal ring 16 is guided relative to the plunger bore 4 of the housing 2. A guide portion 46 is also provided on the inner side of the double seal ring 16, said guide portion 46 being formed between the inner annular projection 38 and the free piston 13 on the seal ring carrier 33. The inner guide portion 46 extends the bore 14 in the free piston 13 for accommodating the plunger rod 6. The outer guide portion 45 extends the outer circumference of the free piston 13.

The outer side of the outer annular projection 37 has provided thereon the outer sealing surface 17 which is provided with two sealing lips 39, said sealing lips 39 being formed, triangular in shape, on the annular projection 37. The inner side of the inner annular projection 38 has provided thereon the inner sealing surface 18 which is in sealing contact with the plunger rod 6, also said inner sealing surface 18 being provided with two sealing lips 39 which are formed on said annular projection 38. A U-shaped spring 40 is provided between the radially spaced, outer and inner annularly protruding projections 37, 38 of the double seal ring 16. The spring 40 extends in a ring shape in the double seal ring 16, the outer spring leg 41 and the inner spring leg 42 opening in the axial direction towards the hydraulic reservoir 15. The reservoir-side end of the outer annular projection 37 has provided thereon a protrusion 36, which extends inwards and which retains the spring 40 at its position between the outer and the inner annular projections 37, 38. The outer spring leg 41 and the inner spring leg 42 of the ring-shaped spring apply a pretension to the outer and inner annular projections 37, 38 and press the outer and inner sealing surfaces 17, 18 against the inner wall of the plunger bore 4 and the outer wall of the plunger rod 6, respectively.

Figure 3:
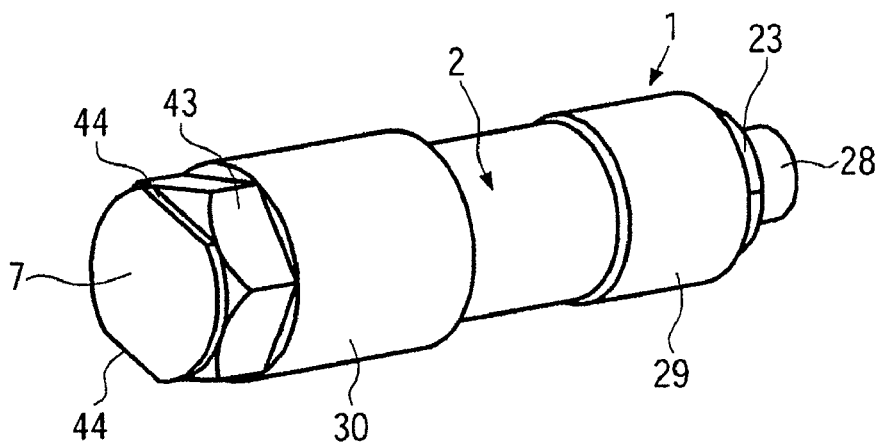
FIG. 3 shows a perspective view of the hydraulic auto-tensioner according to FIG. 1.

In addition to the U-shaped circlip 40, also the seal carrier 33 and the outer as well as the inner annular projections 37, 38 can be made fully of polytetrafluoroethylene (PTFE). Alternatively, it is, however, also possible to coat only the outer and inner sealing surfaces 17, 18 with PTFE. The double seal ring may consist not only of pure PTFE material but also of a PTFE compound. In addition, also PTFE materials and PTFE compounds which have been modified for the respective case of use can be used for an integral double seal ring according to the present invention comprising radially effective outer and inner sealing surfaces 17, 18. In the perspective view of the hydraulic auto-tensioner 1 according to FIG. 3, a screw head-shaped mounting area 43 can be seen on the mounting side in addition to the threaded section 29 provided on the outer surface of the hollow-cylindrical housing 2 and the enlarged section 30, said screw head-shaped mounting area 43 being configured for application of a suitable tool, e.g. a hexagonal wrench, so that the hydraulic tensioner 1 can be mounted on the engine case. The end plug 7 is provided with two flattened head sections 44 which allow also at this point the application of a mounting tool, e.g. a jaw wrench.

In the following, the mode of operation of the hydraulic auto-tensioner 1 according to the present invention will be explained in more detail.

When the hydraulic auto-tensioner 1 according to the present invention shown in FIG. 1 is in operation, the retracting movement of the tensioning plunger 3 is damped by the hydraulic medium contained in the pressure chamber 11. Since the hydraulic medium in the pressure chamber 11 can escape into the hydraulic reservoir 15 only via the leak gap between the plunger base 5 and the plunger bore 4 of the housing 2, a high pressure for reliably damping strong retracting movements of the tensioning plunger 3 builds up in the pressure chamber during operation. In order to allow an escape of air bubbles which arise in the pressure chamber 11, the hydraulic tensioner 1 should be arranged such that these bubbles can escape via the leak gap into the hydraulic reservoir 15 so as to prevent any negative influence on the damping behaviour by compressible air cushions remaining in the pressure chamber.

The hydraulic medium escaping from the pressure chamber 11 during a retracting movement of the tensioning plunger 3, is taken up in the hydraulic reservoir 15. In view of the incoming hydraulic medium, the volume of the hydraulic reservoir 15 will increase. Since the effective cross-sectional area of the hydraulic reservoir 15 is, however, smaller than the cross-sectional area of the pressure chamber 11 in view of the plunger rod 6, the movement of the plunger base 5 during the retracting movement of the tensioning plunger 3 alone will not suffice to realize a sufficient increase in volume; hence, the free piston 13 additionally executes an axial movement in the tensioning direction relative to the plunger bore 4 against the pretensioning force of the return spring 21. The double seal ring 16 has here the effect that the hydraulic reservoir 15 is radially sealed with respect to the inner wall of the plunger bore 4 as well as with respect to the outer wall of the plunger rod 6, in spite of the axial movement of the sealing surfaces 17, 18 relative to the plunger rod 6 and the plunger bore 4. It is thus possible to prevent the hydraulic medium which escapes from the pressure chamber 11 during a retracting movement of the tensioning plunger 3 from getting lost and to store said hydraulic medium in the hydraulic reservoir 15.

During an extension movement of the tensioning plunger 3, the hydraulic medium flows from the hydraulic reservoir 15, via the hydraulic passages 19 provided in the plunger base 5 and via the check valve 20 located on the back of the plunger base 5, back into the pressure chamber 11; the vacuum created in said pressure chamber 11 during the extension movement opens the valve body of the check valve 20 against the pretension of the valve spring. Due to the decreasing volume in the hydraulic reservoir 15, the free piston 13 is moved by the return spring 21 relative to the plunger bore 4 in a direction opposite to the tensioning direction. The opposite axial movements which the free piston 13 executes relative to the plunger rod 6 and the plunger bore 4 of the housing 2 during the extension movement and the retracting movement of the tensioning plunger 3 necessitate good radial sealing characteristics as well as an axial movability of the outer and inner sealing surfaces 17, 18 of the double seal ring 16 over a long period of operation. The composite component comprising the free piston 13 and the double seal ring 16 is reliably guided not only by means of the bore 14 and the outer circumference of the free piston 13 but also with the aid of the outer and inner guide portions 45, 46 of the double seal ring 16. The free piston 13 which acts as a seal carrier, is, on the basis of its structural design, effectively guided on the plunger rod 6 and in the plunger bore 4 in the axial direction and it also provides a good supporting effect with respect to the double seal ring consisting at least partially of PTFE. With regard to the possibilities of use in timing chain drives of internal combustion engines, the double seal ring having the outer and inner sealing surfaces 17, 18 allows operating pressures of up to 50 bar, operating temperatures of up to 150° C. as well as load changes of up to 200 Hz.

The fact that the hydraulic medium escaping from the pressure chamber 11 during damping of the retracting movement of the tensioning plunger 3 is stored in the hydraulic reservoir 15 and returned during an extension movement of the tensioning plunger 3 makes the hydraulic tensioner according to the present invention independent of a supply with hydraulic medium from an external hydraulic circuit, e.g. the oil circuit of the internal combustion engine. It follows that this hydraulically-operated auto chain tensioner can be used independently of an external hydraulic circuit and is therefore suitable for use in a wide variety of applications.

The structural design of the hydraulic auto-tensioner 1 shown in FIG. 1 allows the components arranged in the hollow-cylindrical housing 2 to be mounted from the tensioning side as well as from the mounting side. In addition, the structural design of the hydraulic auto-tensioner 1 can be configured such that the hole plug 23 is implemented as part of the housing 2. Although such an integral structural design of the hole plug 23 and of the housing 2 requires more effort for machining the opening 25 on the tensioning-side end face of the housing, it will then offer the possibility of installing all the interior components from the mounting side. Furthermore, due to the avoidance of the otherwise necessary tolerances for the screw connection 24 between the hole plug 23 and the housing 2, such a structural design of the hydraulic tensioner 1 can improve the guidance of the plunger rod 6, whereby the risk of the plunger base 5 getting wedged in the plunger bore 4 will be reduced.

The invention claimed is:

1. A hydraulic auto-tensioner comprising a housing, a tensioning plunger guided in a plunger bore of said housing, a free piston guided in said plunger bore, a plunger rod formed on said tensioning plunger and extending through the free piston, a hydraulic reservoir delimited by the tensioning plunger, the housing and the free piston, and a sealing unit which is arranged on the free piston and by means of which the hydraulic reservoir is sealed with respect to the housing and the plunger rod, characterized in that the sealing unit is implemented as a double seal ring with an outer sealing surface which is in sliding contact with the plunger bore of the housing, and an inner sealing surface which is in sliding contact with the plunger rod of the tensioning plunger, wherein the double seal ring is provided with a spring means, said spring means pretensioning the outer sealing surface with respect to the plunger bore and the inner sealing surface with respect to the plunger rod.

2. The hydraulic auto-tensioner according to claim 1, wherein the outer sealing surface and the inner sealing surface are implemented as annular, circumferentially extending sealing surfaces, said sealing surfaces being spaced apart and oriented coaxially with the longitudinal axis of the tensioning plunger.

3. The hydraulic auto-tensioner according to claim 2, wherein the outer sealing surface and the inner sealing surface comprise at least two circumferentially extending sealing lips.

4. The hydraulic auto-tensioner according to claim 1, wherein the outer sealing surface or the inner sealing surface comprises at least two circumferentially extending sealing lips.

5. The hydraulic auto-tensioner according to claim 1, wherein the double seal ring comprises an outer guide portion and an inner guide portion.

6. The hydraulic auto-tensioner according to claim 5, wherein the axial length of the outer guide portion or of the inner guide portion is at least 2 mm.

7. The hydraulic auto-tensioner according to claim 5, wherein the axial length of the outer guide portion and of the inner guide portion is at least 2 mm.

8. The hydraulic auto-tensioner according to claim 5, wherein the axial length of the outer guide portion and of the inner guide portion is approximately between 4 and 5 mm.

9. The hydraulic auto-tensioner according to claim 1, wherein the double seal ring is made of PTFE at least in the areas of the outer sealing surface and of the inner sealing surface.

10. The hydraulic auto-tensioner according to claim 1, wherein the spring means is implemented as a spring washer which is U-shaped in cross-section and which comprises an outer spring leg and an inner spring leg.

11. The hydraulic auto-tensioner according to claim 1, wherein the double seal ring comprises a circumferentially extending projection and that the free piston comprises a circumferentially extending fixing groove, the projection of the double seal ring being adapted to be inserted into the fixing groove of the free piston so as to arrange the double seal ring on said free piston.

12. The hydraulic auto-tensioner according to claim 1, wherein the housing is provided with a mounting opening on the end face facing away from the plunger rod, said mounting opening being adapted to be closed by an end plug.

13. The hydraulic auto-tensioner according to claim 12, wherein a seal is provided between the housing and the end plug.

14. The hydraulic auto-tensioner according to claim 12, wherein a seal ring is provided between the housing and the end plug.

15. A method for use of a double seal ring in a hydraulic auto-tensioner, said double seal ring comprising an outer sealing surface and an inner sealing surface and a spring means pretensioning the outer sealing surface with respect to a plunger bore of a housing of the auto-tensioner and the inner sealing surface with respect to a plunger rod formed on a tensioning plunger of the auto-tensioner, said outer sealing surface sealing and sliding in contact with the plunger bore, and said inner sealing surface sealing and sliding in contact with the plunger rod.

* * * * *